United States Patent
Okada (10) Patent No.: US 10,009,557 B2
(45) Date of Patent: Jun. 26, 2018

(54) IMAGING ELEMENT, CONTROL METHOD, PROGRAM, AND ELECTRONIC DEVICE

(71) Applicant: SONY CORPORATION, Tokyo (JP)

(72) Inventor: Chihiro Okada, Tokyo (JP)

(73) Assignee: Sony Corporation, Toyko (JP)

( * ) Notice: Subject to any disclaimer, the term of this patent is extended or adjusted under 35 U.S.C. 154(b) by 0 days. days.

(21) Appl. No.: 15/302,372

(22) PCT Filed: Apr. 3, 2015

(86) PCT No.: PCT/JP2015/060552
§ 371 (c)(1),
(2) Date: Oct. 6, 2016

(87) PCT Pub. No.: WO2015/159729
PCT Pub. Date: Oct. 22, 2015

(65) Prior Publication Data
US 2017/0034458 A1    Feb. 2, 2017

(30) Foreign Application Priority Data
Apr. 16, 2014    (JP) ................................. 2014-084288

(51) Int. Cl.
*H04N 5/217*    (2011.01)
*H04N 5/353*    (2011.01)
(Continued)

(52) U.S. Cl.
CPC ......... *H04N 5/353* (2013.01); *H04N 5/23241* (2013.01); *H04N 5/351* (2013.01);
(Continued)

(58) Field of Classification Search
CPC .... H04N 5/378; H04N 5/37455; H04N 5/357; H04N 5/374; H04N 5/3658;
(Continued)

(56) References Cited

U.S. PATENT DOCUMENTS

| 2009/0244328 A1* | 10/2009 | Yamashita | ............ H04N 5/357 348/241 |
| 2010/0097015 A1* | 4/2010 | Knoedgen | ................ G01D 5/24 318/135 |

(Continued)

FOREIGN PATENT DOCUMENTS

| JP | 2005-328135 | 11/2005 |
| JP | 2007-059991 | 3/2007 |

(Continued)

OTHER PUBLICATIONS

International Search Report prepared by the Japan Patent Office on Jun. 2, 2015, for International Application No. PCT/JP2015/060552.

*Primary Examiner* — Trung Diep
(74) *Attorney, Agent, or Firm* — Sheridan Ross P.C.

(57) ABSTRACT

The present disclosure relates to an imaging element, a control method, a program, and an electronic device that can provide an electronic ND function by means of a simpler configuration. The imaging element includes a reference signal generation unit and an A/D conversion unit that includes a comparison unit and a switching unit that switches a capacitance connected to a terminal through which the pixel signal is inputted to the comparison unit and A/D-converts the pixel signal. In the case where the exposure time at the time when the image one frame before was captured is smaller than a prescribed first threshold, the switching unit is controlled so as to increase the capacitance connected to the terminal through which the pixel signal is inputted to the comparison unit. The present technology can be applied to a CMOS image sensor, for example.

6 Claims, 6 Drawing Sheets

(51) Int. Cl.
  *H04N 5/351*   (2011.01)
  *H04N 5/355*   (2011.01)
  *H04N 5/378*   (2011.01)
  *H04N 5/232*   (2006.01)
  *H04N 5/3745*  (2011.01)

(52) U.S. Cl.
  CPC ............. *H04N 5/355* (2013.01); *H04N 5/378* (2013.01); *H04N 5/37455* (2013.01)

(58) Field of Classification Search
  CPC ...... H04N 5/37452; H03M 1/56; H03M 1/42; H03M 1/00
  See application file for complete search history.

(56) References Cited

U.S. PATENT DOCUMENTS

2014/0034812 A1* 2/2014 Ikuma .................. H04N 5/3577
                                                      250/208.1
2014/0252202 A1* 9/2014 Chou ................... H04N 5/3355
                                                      250/208.1

FOREIGN PATENT DOCUMENTS

| JP | 2013-179577 A | 9/2013 |
| JP | 2013-251607 A | 12/2013 |
| WO | WO 2013/084809 A1 | 6/2013 |

* cited by examiner

ND FUNCTION BY MEANS OF A SIMPLER CONFIGURATION.

IMAGING ELEMENT, CONTROL METHOD, PROGRAM, AND ELECTRONIC DEVICE

CROSS REFERENCE TO RELATED APPLICATIONS

This application is a national stage application under 35 U.S.C. 371 and claims the benefit of PCT Application No PCT/JP2015/060552 having an international filing claimed the benefit of Japanese Patent Application No. 2014-084288 filed 16 Apr. 2014, the disclosures of which are incorporated herein by reference in their entirety.

TECHNICAL FIELD

The present disclosure relates to an imaging element, a control method, a program, and an electronic device, and relates particularly to an imaging element, a control method, a program, and an electronic device that can provide an electronic neutral density (ND) function by means of a simpler configuration.

BACKGROUND ART

Conventionally, in an electronic device having an imaging function such as a digital still camera or a digital video camera, for example, a solid state imaging element such as a charge-coupled device (CCD) or complementary metal oxide semiconductor (CMOS) image sensor is used. The solid state imaging element includes a pixel in which a photodiode (PD) that performs photoelectric conversion and a plurality of transistors are combined, and an image is constructed on the basis of pixel signals outputted from a plurality of pixels arranged in a planar way. The pixel signals outputted from the pixels are, for example, A/D-converted by a plurality of analog-to-digital (A/D) converters arranged individually for columns of pixels, and are outputted.

For example, in Patent Literature 1, a solid state imaging element including an A/D converter configured to include a comparator that compares a saw wave-like ramp signal and a pixel signal and a counter is disclosed. Further, in Patent Literature 2, a solid state imaging element in which, in an A/D conversion system called a single-slope integration type, gain adjustment can be made by changing the slope of a reference signal supplied to a comparison circuit is disclosed.

In the imaging device, for example, when the subject is bright, the amount of light is reduced by an aperture mechanism placed in an optical system that collects light to the solid state imaging element. However, in an imaging device including an optical system with a simple aperture mechanism, when moving images are captured under a high illuminance, the exposure time for one image (one frame) of the images constituting the moving images is extremely short. Hence, the continuity between frames is impaired, and moving images having a feeling of skipping are captured.

In contrast, conventionally, for example, electronic ND functions that reduce the light electronically are proposed, such as a configuration in which a variable capacitance is provided in a pixel to make the conversion efficiency variable and a configuration in which quadra-coding that uses 4 pixels as 1 pixel is used and only the single pixels are accessed.

CITATION LIST

Patent Literature

Patent Literature 1: JP 2005-328135A
Patent Literature 2: JP 2007-59991A.

SUMMARY OF INVENTION

Technical Problem

However, in both of the electronic ND functions described above, the layout of the pixel portion is complicated; therefore, it has been desired to provide an electronic ND function by means of a simpler configuration.

The present disclosure has been made in view of such circumstances, and makes it possible to provide an electronic ND function by means of a simpler configuration.

Solution to Problem

According to an aspect of the present disclosure, there is provided an imaging element including: an A/D conversion unit configured to A/D-convert a pixel signal outputted from a pixel; and a reference signal generation unit configured to generate a reference signal that is referred to when the pixel signal is A/D-converted in the A/D conversion unit. The A/D conversion unit includes a comparison unit configured to compare the pixel signal and the reference signal, and a switching unit configured to switch a capacitance connected to a terminal through which the pixel signal is inputted to the comparison unit.

According to an aspect of the present disclosure, there is provided a method or a program for controlling an imaging element, the imaging element including an A/D conversion unit configured to A/D-convert a pixel signal outputted from a pixel, and a reference signal generation unit configured to generate a reference signal that is referred to when the pixel signal is A/D-converted in the A/D conversion unit, the A/D conversion unit including a comparison unit configured to compare the pixel signal and the reference signal, and a switching unit configured to switch a capacitance connected to a terminal through which the pixel signal is inputted to the comparison unit, the method or the program including: a step of acquiring an exposure time at a time when an image one frame before was captured; and a step of in a case where the exposure time is smaller than a prescribed first threshold, controlling the switching unit so as to increase the capacitance connected to the terminal through which the pixel signal is inputted to the comparison unit.

According to an aspect of the present disclosure, there is provided an electronic device including an imaging element, the imaging element including an A/D conversion unit configured to A/D-convert a pixel signal outputted from a pixel, and a reference signal generation unit configured to generate a reference signal that is referred to when the pixel signal is A/D-converted in the A/D conversion unit, the A/D conversion unit including a comparison unit configured to compare the pixel signal and the reference signal, and a switching unit configured to switch a capacitance connected to a terminal through which the pixel signal is inputted to the comparison unit.

In an aspect of the present disclosure, an imaging element includes an A/D conversion unit configured to A/D-convert a pixel signal outputted from a pixel, and a reference signal generation unit configured to generate a reference signal that is referred to when the pixel signal is A/D-converted in the A/D conversion unit, and the A/D conversion unit includes a comparison unit configured to compare the pixel signal and the reference signal, and a switching unit configured to switch a capacitance connected to a terminal through which the pixel signal is inputted to the comparison unit. An exposure time at a time when an image one frame before was captured is acquired, and in a case where the exposure time is smaller than a prescribed first threshold, the switching unit is controlled so as to increase the capacitance connected to the terminal through which the pixel signal is inputted to the comparison unit.

Advantageous Effects of Invention

According to an aspect of the present disclosure, an electronic ND function can be provided by means of a simpler configuration.

DESCRIPTION OF EMBODIMENT(S)

Hereinbelow, specific embodiments to which the present technology is applied are described in detail with reference to the drawings.

Figure 1:
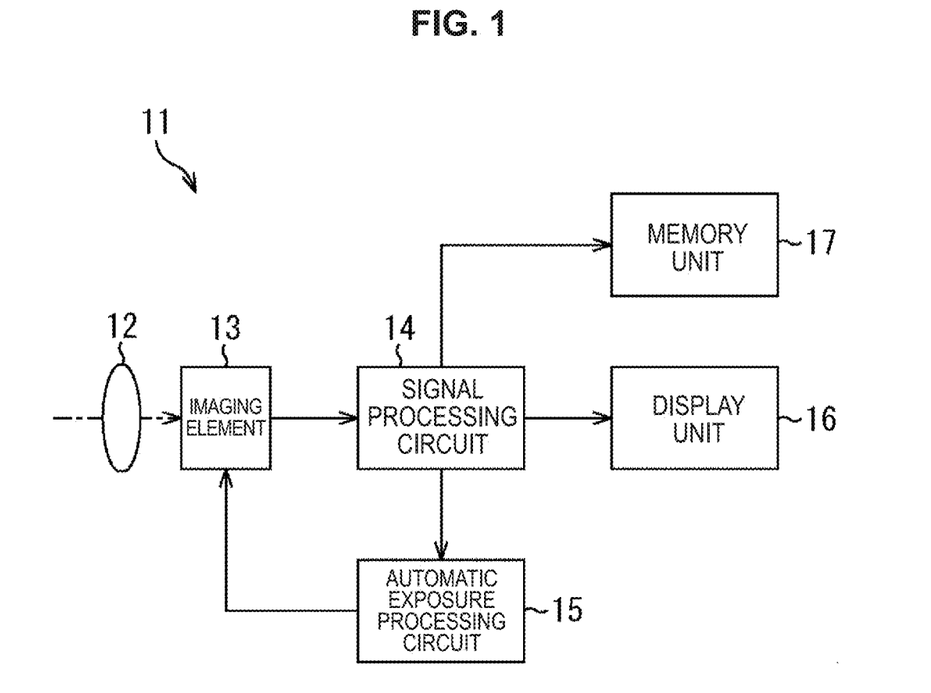
FIG. 1 is a block diagram showing an example of the configuration of an embodiment of an imaging device to which the present technology is applied.

FIG. 1 is a block diagram showing an example of the configuration of an embodiment of an imaging device that is an example of the electronic device to which the present technology is applied.

As shown in FIG. 1, an imaging device 11 is configured to include an optical system 12, an imaging element 13, a signal processing circuit 14, an automatic exposure processing circuit 15, a display unit 16, and a memory unit 17. The imaging device 11 is, for example, an electronic device capable of capturing still images and moving images, such as a digital still camera or a digital video camera.

The optical system 12 is configured to include one or a plurality of lenses, and guides image light from a subject (incident light) to the imaging element 13 to form an image on the light receiving surface of the imaging element 13.

The imaging element 13 includes a plurality of pixels arranged in a matrix configuration on the light receiving surface that receives light collected by the optical system 12, and supplies a pixel signal in accordance with the amount of light received by each pixel to the signal processing circuit 14. The configuration of the imaging element 13 will be described later with reference to FIG. 2.

The signal processing circuit 14 performs various signal processings such as white balance adjustment and gamma correction on a pixel signal supplied from the imaging element 13 to construct an image (image data) based on the pixel signal, and supplies the image to the automatic exposure processing circuit 15, the display unit 16, and the memory unit 17.

The automatic exposure processing circuit 15 performs automatic exposure processing in which the brightness of an image captured by the imaging element 13 is detected and the brightness of the image is adjusted automatically so as to obtain an appropriate brightness in accordance with an exposure value inputted by the user using, for example, a not-shown input unit. For example, the automatic exposure processing circuit 15 finds the average value of all the pixel signals outputted from the imaging element 13 to detect the brightness of the image (hereinafter, referred to as a sensor output level as appropriate), and supplies the sensor output level to the imaging element 13. Thereby, in the imaging element 13, the brightness of the image is adjusted in accordance with the sensor output level.

The display unit 16 is formed of, for example, a liquid crystal panel, an organic electro-luminescence (EL) panel, or the like, and displays an image supplied from the signal processing circuit 14.

The memory unit 17 is formed of, for example, a non-volatile memory installed in the imaging device 11, a removable medium attachable to and detachable from the imaging device 11, or the like, and stores an image (image data) supplied from the signal processing circuit 14.

In the imaging device 11 thus configured, an image captured by the imaging element 13 is displayed on the display unit 16; and when a not-shown shutter button is manipulated, an image captured at this timing is stored in the memory unit 17. The brightness of the image captured by the imaging element 13 is controlled by the automatic exposure processing circuit 15.

Figure 2:
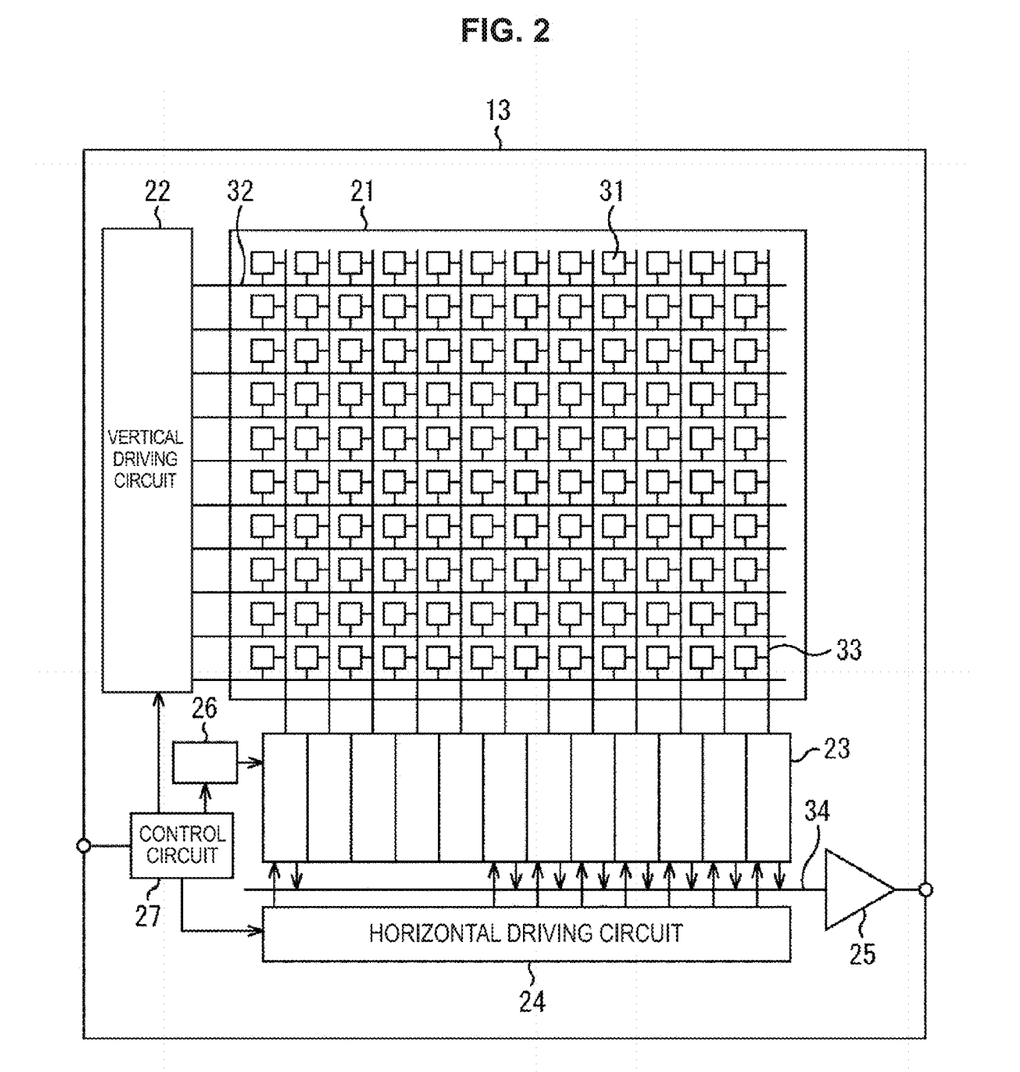
FIG. 2 is a diagram showing an example of the configuration of an imaging element.

Next, in FIG. 2, example of the configuration of the imaging element 13 is shown.

As shown in FIG. 2, the imaging element 13 is configured to include a pixel area 21, a vertical driving circuit 22, a column signal processing circuit 23, a horizontal driving circuit 24, an output circuit 25, a ramp signal generation circuit 26, and a control circuit 27, The pixel area 21 is a light receiving surface that receives light collected by the optical system 12 of FIG. 1. A plurality of pixels 31 are arranged in a matrix configuration in the pixel area 21, and each pixel 31 is connected to the vertical driving circuit 22 via a horizontal signal line 32 on a row basis and to the column signal processing circuit 23 via a vertical signal line 33 on a column basis. Each of the plurality of pixels 31 outputs a pixel signal at a level in accordance with the amount of light received by itself, and an image of the subject formed in the pixel area 21 is constructed from the pixel signals.

The vertical driving circuit 22 supplies, to the pixel 31 via the horizontal signal line 32, a driving signal for driving (transferring, selecting, resetting, etc.) each pixel 31 on a row basis of the plurality of pixels 31 arranged in the pixel area 21.

The column signal processing circuit 23 performs correlated double sampling (CDS) processing on pixel signals outputted from the plurality of pixels 31 via the vertical signal lines 33, and thereby performs the A/D conversion of the pixel signals and removes the reset noise. For example, the column signal processing circuit 23 is configured to include a plurality of column processing units 41 (see FIG. 3 described later) in accordance with the number of columns of pixels 31, and is capable of performing CDS processing on a column basis of pixels 31 in parallel.

The horizontal driving circuit 24 supplies, to the column signal processing circuit 23, a driving signal for causing a pixel signal to be outputted from the column signal processing circuit 23 to a data output signal line 34 on a column basis of the plurality of pixels 31 arranged in the pixel area 21.

The output circuit 25 amplifies a pixel signal that is supplied from the column signal processing circuit 23 via the data output signal line 34 at a timing in accordance with a driving signal of the horizontal driving circuit 24, and outputs the amplified pixel signal to the signal processing circuit 14 (FIG. 1) in a later stage.

The ramp signal generation circuit 26 generates, as a reference signal that is referred to when the column signal processing circuit 23 A/D-converts a pixel signal, a ramp signal of a voltage that drops with the lapse of time at a fixed gradient (a slope voltage), and supplies the ramp signal to the column signal processing circuit 23.

The control circuit 27 controls the driving of each block in the imaging element 13. For example, the control circuit 27 generates a clock signal in accordance with the driving period of each block, and supplies the clock signal to each block. In the imaging device 11, for example, images are captured continuously at a prescribed frame rate, and the control circuit 27 performs the control of switching the driving mode of the imaging element 13 on the basis of the exposure time (shutter speed) at the time when the image one frame before was captured.

Figure 3:
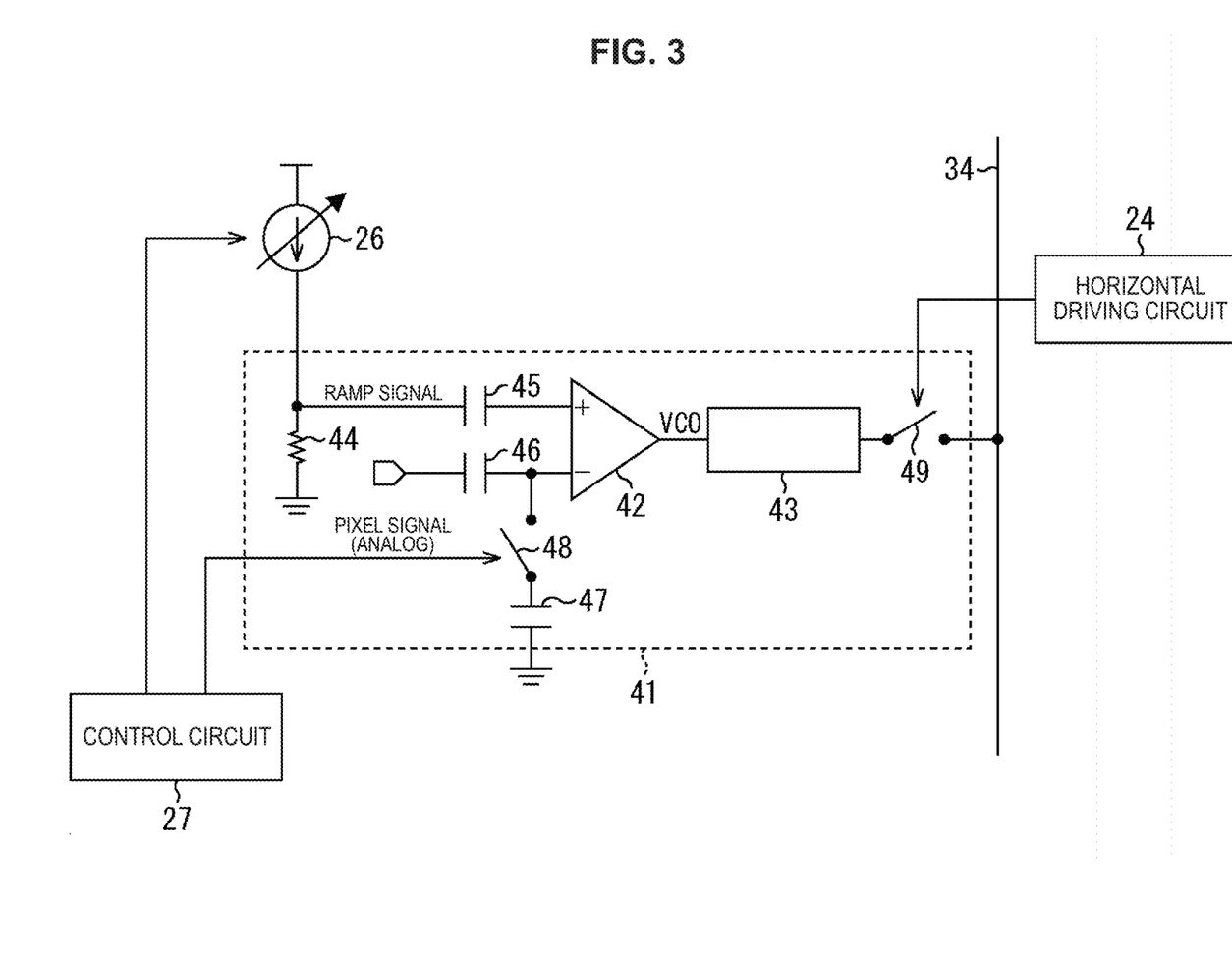
FIG. 3 is a diagram showing an example of the configuration of a column processing unit included in a column signal processing circuit.

Next, in FIG. 3, an example of the configuration of the column processing unit 41 included in the column signal processing circuit 23 is shown.

The column signal processing circuit 23 is configured to include a plurality of column processing units 41 as described above, and one of the column processing units 41 is shown in FIG. 3. The plurality of column processing units 41 are configured similarly, and the illustration thereof is omitted.

As shown in FIG. 3, the column processing unit 41 is configured to include a comparator 42, a counter 43, a resistance 44, capacitors 45 to 47, and switches 48 and 49, and A/D-converts the pixel signal outputted from the pixel.

The input terminal on the plus side of the comparator 42 is connected to the ramp signal generation circuit 26 via the capacitor 45, and the connection point between the capacitor 45 and the ramp signal generation circuit 26 is grounded via the resistance 44. Therefore, an electric potential in accordance with the ramp signal outputted from the ramp signal generation circuit 26 is applied to the input terminal on the plus side of the comparator 42. The ramp signal generation circuit 26 adjusts the amount of output current for outputting the ramp signal in accordance with an output current control signal supplied from the control circuit 27.

On the other hand, the input terminal on the minus side of the comparator 42 is connected to the vertical signal line 33 of FIG. 2 via the capacitor 46, and an electric potential in accordance with the analog pixel signal outputted from the pixel 31 is applied to the input terminal on the minus side of the comparator 42. One terminal of the switch 48 is connected to the connection point between the capacitor 46 and the comparator 42, and the other terminal of the switch 48 is grounded via the capacitor 47. The switch 48 opens and closes in accordance with an amplitude adjustment control signal supplied from the control circuit 27.

The output terminal of the comparator 42 is connected to the input of the counter 43, and the output terminal of the counter 43 is connected to the data output signal line 34 via the switch 49. The switch 49 opens and closes in accordance with a driving signal outputted from the horizontal driving circuit 24.

The comparator 42 determines the magnitude between an input signal inputted to the input terminal on the plus side and an input signal inputted to the input terminal on the minus side, and outputs an output signal VCO indicating the determination result. In other words, the comparator 42 determines the magnitude relationship between the electric potential of the ramp signal applied to the input terminal on the plus side and the electric potential of the analog pixel signal outputted from the pixel 31 and applied to the input terminal on the minus side. The comparator 42 outputs an output signal VCO at a high level in the case where the ramp signal is larger than the analog pixel signal, and outputs an output signal VCO at a low level in the case where the ramp signal is equal to or less than the analog pixel signal, for example.

The counter 43 counts a prescribed number of clocks from the timing when the electric potential of the ramp signal supplied from the ramp signal generation circuit 26 starts to drop at a fixed gradient to the timing when the output signal VCO outputted from the comparator 42 switches from a high level to a low level, for example. Therefore, the count value counted by the counter 43 is a value in accordance with the electric potential of the pixel signal inputted to the comparator 42, and thereby the analog pixel signal outputted from the pixel 31 is converted to a digital value.

In the imaging element 13, for example, a signal at a level at which the photodiode of the pixel 31 is reset and a signal at a level at which a charge photoelectrically converted by the photodiode of the pixel 31 is retained are outputted from the pixel 31. At the time of A/D-converting the pixel signal in the column processing unit 41, the difference between those signals is found; thereby, a pixel signal in which the reset noise is removed is outputted.

At the timing of outputting a pixel signal of a column in which a prescribed column processing unit 41 is placed, the switch 49 is closed in accordance with a driving signal outputted from the horizontal driving circuit 24, and the output terminal of the counter 43 is connected to the data output signal line 34. Thereby, a pixel signal A/D-converted in the column processing unit 41 is outputted to the data output signal line 34.

Here, in the imaging element 13, the control circuit 27 can perform the control of switching the driving mode of the imaging element 13 on the basis of the exposure time t (shutter speed) at the time when the image one frame before was captured. For example, the control circuit 27 can switch the driving mode of the imaging element 13 to any of ordinary driving as in the past, low consumption driving in which the power consumption of the imaging element 13 is suppressed, and electronic ND driving in which the brightness of the image captured by the imaging element 13 is reduced electronically.

The switching of the driving mode of the imaging element 13 by the control circuit 27 will now be described with reference to FIG. 4.

Figure 4:
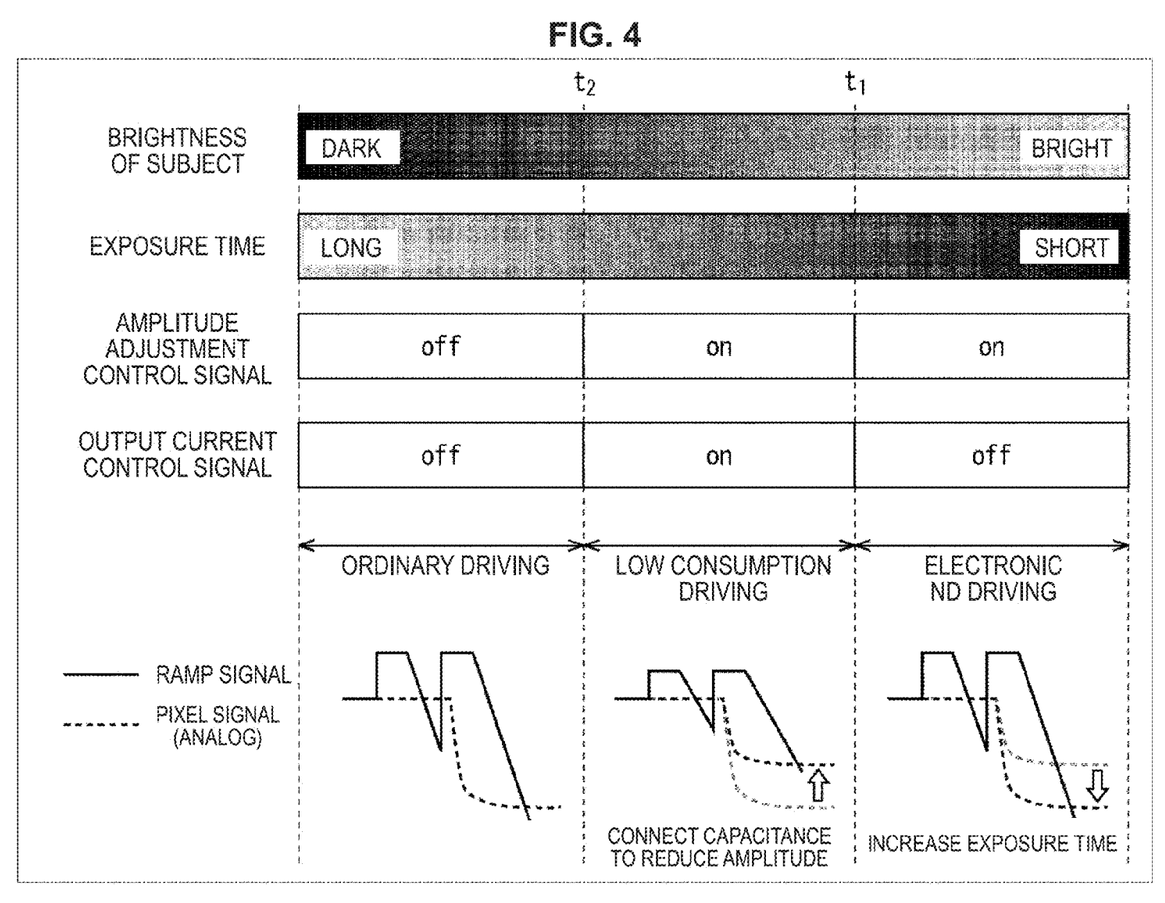
FIG. 4 is a diagram describing the switching of the driving mode of the imaging element.

As shown in FIG. 4, in general, the exposure time t is long when the brightness of the subject is low, and the exposure time t is short when the brightness of the subject is high. Therefore, when the brightness of the subject is high and the exposure time is short, in order to avoid unnatural moving images in which the movement is seen in a skipping way, the control of setting the driving mode of the imaging element 13 to electronic ND driving is performed in the imaging device 11. Furthermore, in the imaging device 11, when the brightness of the subject is neither low nor high, the control of setting the driving mode of the imaging element 13 to low consumption driving is performed.

For example, in the control circuit 27, a threshold for electronic ND driving t1 and a threshold for low consumption driving t2 are set in advance as thresholds used at the time of switching the driving mode of the imaging element 13. The threshold for electronic ND driving t1 is determined from, for example, the storage time of the pixel 31 at the time when a feeling of skipping of moving images begins to be noticeable.

On the other hand, the threshold for low consumption driving t2 is determined from, for example, an exposure value that satisfies a sufficient number of photoelectrons to maintain a relationship in which the optical shot noise derived from the pixel 31 is much larger than the input-referred noise of the comparator 42, even when the gain at the time of A/D-converting the pixel signal in the column processing unit 41 is reduced. For simplification, as the threshold for low consumption driving t2, the aperture value of the lens included in the optical system 12 or the storage time of storing a charge in the pixel 31 may be used, and the storage time is used in the embodiment, for example. As illustrated, the threshold for low consumption driving t2 is set to a value larger than the threshold for electronic ND driving t1 (that is, on the side where the exposure time is longer).

The control circuit 27 compares the exposure time t when the image one frame before was captured, and the threshold for electronic ND driving t1 and the threshold for low consumption driving t2. Consequently, on the basis of the magnitude relationship, the control circuit 27 outputs an amplitude adjustment control signal that instructs the switching between ON and OFF of the switch 48 of the column processing unit 41, and outputs an output current control signal that instructs the switching of the amount of output current outputted from the ramp signal generation circuit 26.

For example, in the case where the exposure time t one frame before is equal to or more than the threshold for low consumption driving t2 (t≥t2), the control circuit 27 sets the amplitude adjustment control signal to OFF. On the other hand, in the case where the exposure time t one frame before is smaller than the threshold for low consumption driving t2 (t<t2), the control circuit 27 sets the amplitude adjustment control signal to ON.

Further, in the case where the exposure time t one frame before is equal to or more than the threshold for electronic ND driving t1 and at the same time smaller than the threshold for low consumption driving t2 (t1≤t<t2), the control circuit 27 sets the output current control signal to ON. On the other hand, in the case where the exposure time t one frame before is smaller than the threshold for electronic ND driving t1 (t<t1) and in the case where the exposure time t one frame before is equal to or more than the threshold for low consumption driving t2 (t≥t2), the control circuit 27 sets the output current control signal to OFF.

Therefore, in the case where the exposure time t one frame before is equal to or more than the threshold for low consumption driving t2 (t2<t), both the amplitude adjustment control signal and the output current control signal are OFF. Therefore, in this case, only the capacitor 46 is connected to the input terminal on the minus side of the comparator 42, and the ramp signal generation circuit 26 outputs a ramp signal at an ordinary output current. Thereby, the imaging element 13 performs ordinary driving as in the past.

Further, in the case where the exposure time t one frame before is equal to or more than the threshold for electronic ND driving t1 and at the same time smaller than the threshold for low consumption driving t2 (t1≤t<t2), both the amplitude adjustment control signal and the output current control signal are ON. That is, in this case, the capacitor 47 as well as the capacitor 46 is connected to the input terminal on the minus side of the comparator 42, and the ramp signal generation circuit 26 outputs a ramp signal while suppressing the output current.

Thus, by the capacitor 47 being connected to the input terminal on the minus side of the comparator 42, the capacitance is increased, and thereby the amplitude of the pixel signal inputted to the comparator 42 is reduced. Hence, even when the output current at the time when the ramp signal generation circuit 26 outputs the ramp signal is suppressed and the displacement of the ramp signal is small, the pixel signal can be A/D-converted in the column processing unit 41. Therefore, the imaging element 13 can be driven by low power consumption in accordance with the suppression of the output current of the ramp signal generation circuit 26.

Further, in the case where the exposure time t one frame before is smaller than the threshold for electronic ND driving t1 (t<t1), the amplitude adjustment control signal is ON and the output current control signal is OFF. That is, in this case, the capacitor 47 as well as the capacitor 46 is connected to the input terminal on the minus side of the comparator 42, and the ramp signal generation circuit 26 outputs a ramp signal at an ordinary output current.

By the capacitor 47 being thus connected to the input terminal on the minus side of the comparator 42, the capacitance is increased, and thereby the amplitude of the pixel signal inputted to the comparator 42 is reduced. At this time, since the ramp signal generation circuit 26 has outputted a ramp signal with an ordinary displacement, the exposure time is increased (expanded), and consequently the behavior of an ND filter function is exhibited; therefore, the imaging element 13 can perform electronic ND driving.

Thus, the control circuit 27 can switch the driving mode of the imaging element 13 to any of ordinary driving, low consumption driving, and electronic ND driving on the basis of the exposure time t one frame before.

Figure 5:
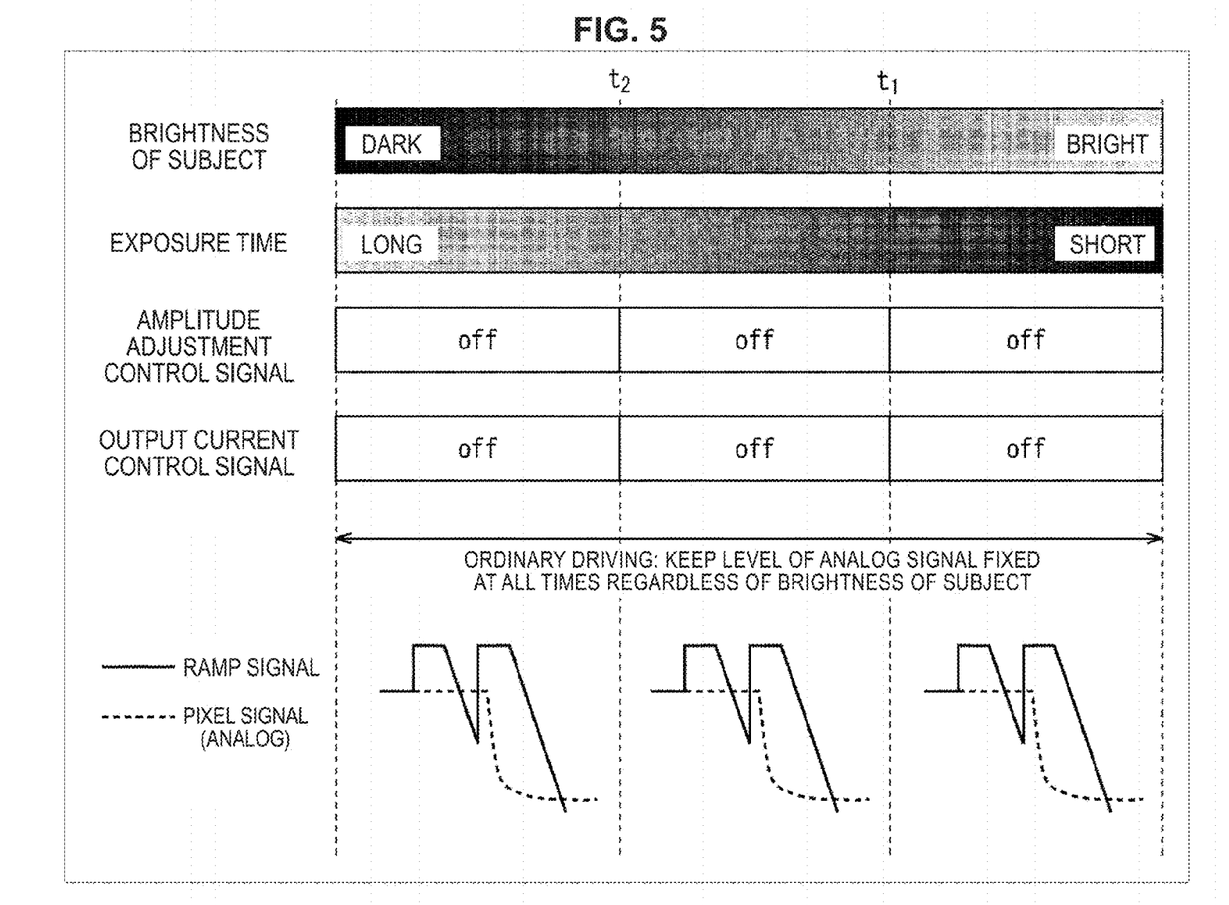
FIG. 5 is a diagram describing conventional automatic exposure processing.

Here, a description is given with comparison to conventional automatic exposure processing shown in FIG. 5.

In the conventional automatic exposure processing, control based on the amplitude adjustment control signal and the output current control signal is not performed, and the amplitude adjustment control signal and the output current control signal are similar, that is, constantly in the OFF state. In the conventional automatic exposure processing, the imaging element 13 performs ordinary driving, and the level of the pixel signal is kept fixed at all times regardless of the brightness of the subject. Hence, ordinary driving in which the level of the pixel signal (analog) is kept fixed at all times regardless of the brightness of the subject is performed. Therefore, for example, when the brightness of the subject is very high, the exposure time is extremely short, and unnatural moving images having a feeling of skipping like that described above are captured.

In contrast, in the imaging device 11, when the brightness of the subject is very high and the exposure time t is shorter than the threshold for electronic ND driving t1, the driving mode of the imaging element 13 is set to electronic ND driving. Thereby, the exposure time is increased, and the imaging device 11 can capture more natural, smooth moving images.

Figure 6:
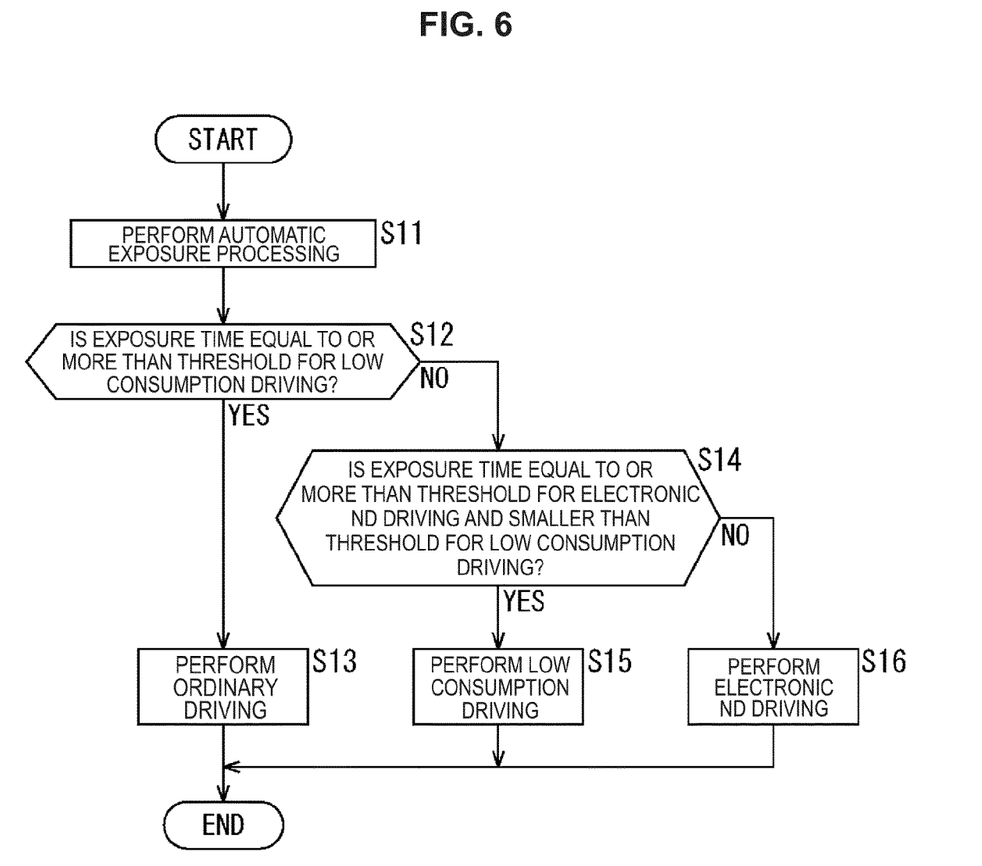
FIG. 6 is a flow chart describing the processing of switching the driving mode of the imaging element.

Next, FIG. 6 is a flow chart describing the processing of switching the driving mode of the imaging element 13.

When, for example, the capture of moving images is started in the imaging device 11 and a prescribed number of frames of images are captured, the processing is started. In step S11, the automatic exposure processing circuit 15 of FIG. 1 performs automatic exposure processing in which the brightness of an image captured by the imaging element 13 is detected and the image is adjusted to an appropriate brightness. Then, the automatic exposure processing circuit 15 notifies the exposure time t at the time when the image is captured to the control circuit 27 so that the exposure time t can be referred to when the image of the next frame is captured.

In step S12, the control circuit 27 determines whether the exposure time t one frame before is equal to or more than the threshold for low consumption driving t2 or not. In the case where the control circuit 27 has determined that the exposure time t one frame before is equal to or more than the threshold for low consumption driving t2, the processing goes to step S13.

In step S13, the control circuit 27 sets the amplitude adjustment control signal and the output current control signal to OFF, and thereby sets the driving mode of the imaging element 13 to ordinary driving; thus, the processing is finished.

On the other hand, in the case where in step S12 the control circuit 27 has determined that the exposure time t one frame before is not equal to or more than (less than) the threshold for low consumption driving t2, the processing goes to step S14.

In step S14, the control circuit 27 determines whether the exposure time t one frame before is equal to or more than the threshold for electronic ND driving t1 and at the same time smaller than the threshold for low consumption driving t2 or not. In the case where the control circuit 27 has determined that the exposure time t one frame before is equal to or more than the threshold for electronic ND driving if and at the same time smaller than the threshold for low consumption driving 12, the processing goes to step S15.

In step S15, the control circuit 27 sets the amplitude adjustment control signal and the output current control signal to ON, and thereby sets the driving mode of the imaging element 13 to low consumption driving; thus, the processing is finished.

On the other hand, in the case where in step S12 the control circuit 27 has determined that the exposure time t one frame before is not equal to or more than the threshold for electronic ND driving t1 and at the same time smaller than the threshold for low consumption driving t2 (that is, with the determination of step S12 taken into consideration, smaller than the threshold for electronic ND driving t1), the processing goes to step S16.

In step S16, the control circuit 27 sets the amplitude adjustment control signal to ON and sets the output current control signal to OFF, and thereby sets the driving mode of the imaging element 13 to electronic ND driving; thus, the processing is finished.

As described above, in the imaging element 13, the control circuit 27 performs the control of increasing a capacitance connected to the input terminal on the minus side of the comparator 42 and the control of reducing the amount of output current outputted from the ramp signal generation circuit 26; thereby, the driving mode of the imaging element 13 can be switched to ordinary driving, low consumption driving, or electronic ND driving. Thereby, in the imaging device 11, smooth moving images in which the continuity between frames is kept can be captured, and power consumption can be suppressed.

Furthermore, in the imaging element 13, an electronic ND function can be achieved without complicating the layout in the pixel area 21. That is, in the imaging element 13, a configuration in which the capacitor 48 and the switch 48 for adjusting the amplitude of the pixel signal are provided in the column processing unit 41 is employed, and the control circuit 27 performs the control of switching the ON and OFF of the switch 48 by using the amplitude adjustment control signal; thus, an electronic ND function can be achieved in a simple manner.

Furthermore, in the imaging element 13, the ramp signal generation circuit 26 suppresses the amount of output current in accordance with the output current control signal supplied from the control circuit 27; thereby, power consumption can be reduced.

Each processing described with reference to the flow chart described above does not necessarily need to be performed on a time-series basis in conformity with the sequence described as a flow chart, and also processing executed in parallel or individually (for example, parallel processing or processing based on the object) may be included. The program may be one to be executed by one CPU, or one to be executed distributedly by a plurality of CPUs.

The solid state imaging element to which the present technology is applied may be used for, as well as an imaging device like that shown in FIG. 1, various electronic devices having an imaging function, such as a mobile phone having an imaging function and what is called a smartphone.

Additionally, the present technology may also be configured as below.

(1)

An imaging element including:

an A/D conversion unit configured to analog-to-digital (A/D)-convert a pixel signal outputted from a pixel; and a reference signal generation unit configured to generate a reference signal that is referred to when the pixel signal is A/D-converted in the A/D conversion unit, wherein the A/D conversion unit includes a comparison unit configured to compare the pixel signal and the reference signal, and a switching unit configured to switch a capacitance connected to a terminal through which the pixel signal is inputted to the comparison unit.

(2)

The imaging element according to (1), further including a control unit configured to acquire an exposure time at a time when image one frame before was captured and, in a case where the exposure time is smaller than a prescribed first threshold, control the switching unit so as to increase the capacitance connected to the terminal through which the pixel signal is inputted to the comparison unit.

(3)

The imaging element according to (1) or (2), wherein, in a case where the exposure time is equal to or more than a prescribed second threshold and smaller than the first threshold, the control unit controls the switching unit so as to increase the capacitance connected to the terminal through which the pixel signal is inputted to the comparison unit and further controls the reference signal generation unit so as to reduce the amount of the output current.

(4)

A method for controlling an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the A/D conversion unit including a comparison unit configured to compare the pixel signal and the reference signal, and a switching unit configured to switch a capacitance connected to a terminal through which the pixel signal is inputted to the comparison unit, the method including:

a step of acquiring an exposure time at a time when an image one frame before was captured; and a step of, in a case where the exposure time is smaller than a prescribed first threshold, controlling the switching unit so as to increase the capacitance connected to the terminal through which the pixel signal is inputted to the comparison unit.

(5)

A program for causing a computer to execute control of an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the A/D conversion unit including a comparison unit configured to compare the pixel signal and the reference signal, and a switching unit configured to switch a capacitance connected to a terminal through which the pixel signal is inputted to the comparison unit, the program being configured to cause a computer to execute processing including:

a step of acquiring an exposure time at a time when an image one frame before was captured; and a step of, in a case where the exposure time is smaller than a prescribed first threshold, controlling the switching unit so as to increase the capacitance connected to the terminal through which the pixel signal is inputted to the comparison unit.

(6)

An electronic device including an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the A/D conversion unit including a comparison unit configured to compare the pixel signal and the reference signal, and a switching unit configured to switch a capacitance connected to a terminal through which the pixel signal is inputted to the comparison unit.

The embodiment is not limited to the embodiments described above, and various alterations are possible without departing from the spirit of the present disclosure.

REFERENCE SIGNS LIST 11 imaging device
12 optical system
13 imaging element
14 signal processing circuit
15 automatic exposure processing circuit
16 display unit
17 memory unit
21 pixel area
22 vertical driving circuit
23 column signal processing circuit
24 horizontal driving circuit
25 output circuit
26 ramp signal generation circuit
27 control circuit
31 pixel
32 horizontal signal line
33 vertical signal line
34 data output signal line
41 column processing unit
42 comparator
43 counter
44 resistance
45 to 47 capacitor
48 and 49 switch

What is claimed is:

1. An imaging element comprising:
an A/D converter configured to analog-to-digital (A/D)-convert a pixel signal outputted from a pixel;
a reference signal generation circuit configured to generate a reference signal that is referred to when the pixel signal is A/D-converted in the A/D converter,
wherein the A/D converter includes:
a comparator configured to compare the pixel signal and the reference signal; and
a switch configured to switch a capacitance connected to a terminal through which the pixel signal is inputted to the comparator; and
a control circuit configured to acquire an exposure time at a time when an image one frame before was captured and, in a case where the exposure time is smaller than a prescribed first threshold, control the switch so as to increase the capacitance connected to the terminal through which the pixel signal is inputted to the comparator.

2. The imaging element according to claim 1, wherein, in a case where the exposure time is equal to or more than the first threshold and smaller than a prescribed second threshold, the control circuit controls the switch so as to increase the capacitance connected to the terminal through which the pixel signal is inputted to the comparator and further controls the reference signal generation circuit so as to reduce the amount of the output current.

3. A method for controlling an imaging element,
the imaging element including
an A/D conversion unit configured to analog-to-digital (A/D)-convert a pixel signal outputted from a pixel, and
a reference signal generation unit configured to generate a reference signal that is referred to when the pixel signal is A/D-converted in the A/D conversion unit,
the A/D conversion unit including
a comparison unit configured to compare the pixel signal and the reference signal, and
a switching unit configured to switch a capacitance connected to a terminal through which the pixel signal is inputted to the comparison unit,
the method comprising:
a step of acquiring an exposure time at a time when an image one frame before was captured; and
a step of, in a case where the exposure time is smaller than a prescribed first threshold, controlling the switching unit so as to increase the capacitance connected to the terminal through which the pixel signal is inputted to the comparison unit.

4. A program for causing a computer to execute control of an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the A/D conversion unit including a comparison unit configured to compare the pixel signal and the reference signal, and a switching unit configured to switch a capacitance connected to a terminal through which the pixel signal is inputted to the comparison unit, the program being configured to cause a computer to execute processing including:

a step of acquiring an exposure time at a time when an image one frame before was captured; and a step of, in a case where the exposure time is smaller than a prescribed first threshold, controlling the switching unit so as to increase the capacitance connected to the terminal through which the pixel signal is inputted to the comparison unit.

5. An electronic device comprising an imaging element, the imaging element including:

an A/D converter configured to analog-to-digital (A/D)-convert a pixel signal outputted from a pixel;

a reference signal generation circuit configured to generate a reference signal that is referred to when the pixel signal is A/D-converted in the A/D converter, the A/D converter including:

a comparator configured to compare the pixel signal and the reference signal; and a switch configured to switch a capacitance connected to a terminal through which the pixel signal is inputted to the comparator; and a control circuit configured to acquire an exposure time at a time when an image one frame before was captured and, in a case where the exposure time is smaller than a prescribed first threshold, control the switch so as to increase the capacitance connected to the terminal through which the pixel signal is inputted to the comparator.

6. The electronic device according to claim 5, wherein, in a case where the exposure time is equal to or more than the first threshold and smaller than a prescribed second threshold, the control circuit controls the switch so as to increase the capacitance connected to the terminal through which the pixel signal is inputted to the comparator and further controls the reference signal generation circuit so as to reduce the amount of the output current.

\* \* \* \* \*